Aug. 12, 1930.  E. J. SCHOETTLE  1,773,064
CARDBOARD OR PAPER BOX AND METHOD OF PREPARING THE SAME
Filed June 22, 1926
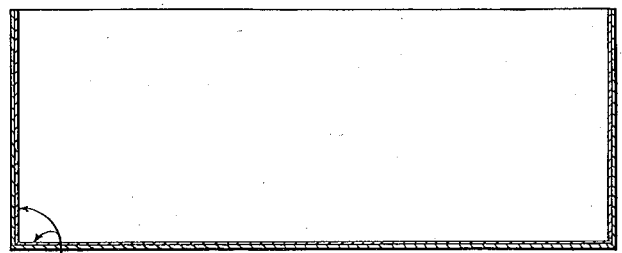
Size of slight acidity containing a nonactinic dye substance.
Inventor:—
Edwin J. Schoettle
by his Attorneys
Howson & Howson Patented Aug. 12, 1930

1,773,064

UNITED STATES PATENT OFFICE

EDWIN J. SCHOETTLE, OF PHILADELPHIA, PENNSYLVANIA

CARDBOARD OR PAPER BOX AND METHOD OF PREPARING THE SAME

Application filed June 22, 1926. Serial No. 117,852.

This invention relates to improvements in cardboard or paper containers.

Certain products normally kept or sold in paper containers or boxes are adversely affected by actinic light, the oxygen of the air and by reaction with certain alkaline fumes given off by many commercial cardboards and papers of which the aforesaid containers are made. Rubber goods for example which often are kept for considerable lengths of time are adversely affected both by actinic light and oxygen of the air, while worsted and other yarns which also generally are contained in pasteboard boxes are frequently discolored by ammonia fumes emanating in minute amount from the materials of which the box is composed and the adhesives employed in their manufacture. This also applies to many forms of knit and other goods.

It is the object of the present invention to provide cardboard or paper containers which may be used for such goods, for example, as mentioned above with assurance that deterioration from the cited causes will be either entirely eliminated or reduced to a minimum.

The drawings illustrate a container treated in accordance with my invention.

My invention consists in the use of a suitable size, preferably in the form of soluble starches or dextrine, mixtures of soluble starches and dextrine, or suitable gums such as gum acacia, so constituted and compounded with other elements as to provide, when applied to the cardboard or paper containers, preferably on the inside, a protective film or coating which will tend to exclude or neutralize the deteriorating elements. I may for example use starch that has been more or less hydrolized, producing soluble starch, and dextrine, or at least one of these products, and to this soluble starch I may add ordinary aluminum sulphate or any acid reacting salt such, for example, as ferrous sulphate. Aluminum sulphate, however, is preferable by reason of the fact that it is colorless. The aluminum sulphate is used primarily as a means for giving a moderate acidity to the mixture so that it can neutralize ammonia fumes coming from paste or from the cardboard used in forming the container. I have found that many varieties of commercial cardboard used for boxes are on the alkaline side, and give off of themselves traces of ammonia, and that these traces are increased by the use of pastes, particularly those containing casein. I therefore bring my size to a distinct acid reaction, but one not sufficiently strong to injure substances contained in the box; and since the aluminum sulphate becomes a neutral salt on drying, there is no easily communicable acid.

In addition to this, I may or may not add to the mixture a trace of orange or yellow color, and for this purpose I have successfully used a mixture of tartrazine and ponceau R. It is, however, practically immaterial what color is used so long as it is water soluble and not affected by the aluminum sulphate. The aforesaid pigment, which is orange-yellow in color, is capable of shutting out a large proportion of the actinic light rays. Obviously this color may be modified in the direction of red satisfactorily, as both the red and orange rays are practically non-actinic.

As a specific example of size made in accordance with this invention, I may cite the following formula:

Soluble potato starch, 100 grams; paper makers' alum, 10 grams; water to make 1000 c. c. of size.

Also as previously stated, I may add to this mixture sufficient tartrazine and ponceau R. to give a pronounced orange-yellow color to the composition.

A size made in accordance with this formula is highly satisfactory by reason of a slight but sufficient acidity,—to neutralize possible ammonia fumes emanating from the material of which the box is formed,—its power to largely exclude the actinic rays which may adversely affect the contents of the box, and by reason further that in one coat applied to the inside of the container a very dense film is obtained which is practically air-proof.

The size is capable of some modification without departure from the essential features of the invention. When for example it is known that the contents of the container will not be affected by the possible slight ammonia fumes emanating as previously described, the alum may be eliminated, and where on the other hand the actinic rays are not objectionable, the size may be made without the aforesaid dyes. For general use, however, a size made as described will be highly satisfactory and generally desirable for coating the insides of all boxes or paper containers as a warranted precaution.

I claim:

1. The method of treating the exterior of paper boxes and the like, which comprises applying to the inner surfaces of the container a film-forming size of slight acidity and containing a non-actinic dye substance.

2. The method of treating the exterior of paper boxes and the like, which comprises applying to the inner surfaces of the container a film-forming size of slight acidity.

EDWIN J. SCHOETTLE.